United States Patent
Schalla et al.

(10) Patent No.: US 9,193,461 B2
(45) Date of Patent: Nov. 24, 2015

(54) INSULATED GALLEY CART AND METHOD OF USING FROZEN REFRIGERANT BRICKS TO MAXIMIZE STORAGE VOLUME AND EQUALIZE TEMPERATURE DISTRIBUTION

(71) Applicant: The Boeing Company, Chicago, IL (US)

(72) Inventors: James P. Schalla, Edmonds, WA (US); Michael J. Burgess, Seattle, WA (US); Mark G. Mehlhaff, Seattle, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 13/890,416

(22) Filed: May 9, 2013

(65) Prior Publication Data

US 2014/0331695 A1 Nov. 13, 2014

(51) Int. Cl.
| | | |
|---|---|---|
| *B64D 11/00* | (2006.01) | |
| *F25D 11/00* | (2006.01) | |
| *A47B 31/02* | (2006.01) | |
| *F25D 25/02* | (2006.01) | |
| *A47B 31/00* | (2006.01) | |

(52) U.S. Cl.
CPC ............ *B64D 11/0007* (2013.01); *A47B 31/02* (2013.01); *F25D 11/003* (2013.01); *F25D 25/028* (2013.01); *A47B 2031/002* (2013.01); *A47B 2031/003* (2013.01); *F25D 11/006* (2013.01)

(58) Field of Classification Search
CPC .. B64D 11/0007; B64D 11/04; F25D 11/003; F25D 11/006; A47B 31/02; A47B 2031/003; A47B 2031/002

USPC ........................... 62/62, 440, 449, 530, 457.2
See application file for complete search history.

(56) References Cited

U.S. PATENT DOCUMENTS

| | | | | |
|---|---|---|---|---|
| 4,346,756 | A | | 8/1982 | Dodd et al. |
| 5,435,142 | A | * | 7/1995 | Silber ............................... 62/60 |
| 5,524,980 | A | * | 6/1996 | Carter et al. ................... 312/351 |
| 6,135,273 | A | * | 10/2000 | Cuen ............................... 206/204 |
| 6,230,515 | B1 | * | 5/2001 | Wiesman ...................... 62/457.1 |
| 6,540,249 | B2 | * | 4/2003 | King .......................... 280/651 |
| 6,651,970 | B2 | * | 11/2003 | Scott ......................... 269/289 R |
| 7,444,830 | B2 | | 11/2008 | Moran et al. |
| 8,474,274 | B2 | * | 7/2013 | Schalla et al. .................... 62/89 |
| 2005/0109722 | A1 | * | 5/2005 | Golias et al. ................... 211/135 |
| 2006/0060494 | A1 | * | 3/2006 | Goodman et al. ............. 206/570 |
| 2007/0043328 | A1 | * | 2/2007 | Goodman et al. ............ 604/317 |

(Continued)

FOREIGN PATENT DOCUMENTS

| | | |
|---|---|---|
| DE | 4308144 C1 | 10/1994 |
| DE | 20014683 U1 | 1/2001 |
| EP | 2438838 A1 | 4/2012 |

OTHER PUBLICATIONS

Translation of description DE 20014683 U1 to Habbel & Habbel.*

(Continued)

*Primary Examiner* — Mohammad M Ali
(74) *Attorney, Agent, or Firm* — Felix L. Fischer

(57) ABSTRACT

A storage container incorporates a housing defining a cavity therein. At least one support rail extends from the housing within the cavity having a plurality of encoded first moieties. At least one refrigerant brick having mating encoded second moieties configured to be received into the encoded first moieties couples the refrigerant brick within the cavity.

19 Claims, 20 Drawing Sheets

(56) References Cited

U.S. PATENT DOCUMENTS

| | | | |
|---|---|---|---|
| 2007/0284985 A1* | 12/2007 | Wing | 312/408 |
| 2008/0208158 A1* | 8/2008 | Goodman et al. | 604/408 |
| 2011/0277489 A1 | 11/2011 | Schalla et al. | |
| 2012/0072046 A1* | 3/2012 | Tattam | 700/300 |

OTHER PUBLICATIONS

Translation of claims of DE 20014683 U1 to Habbel & Habbel.*

* cited by examiner

INSULATED GALLEY CART AND METHOD OF USING FROZEN REFRIGERANT BRICKS TO MAXIMIZE STORAGE VOLUME AND EQUALIZE TEMPERATURE DISTRIBUTION

BACKGROUND INFORMATION

1. Field

Embodiments of the disclosure relate generally to the field of food service carts for airline in-flight food service and more particularly to a refrigerant brick and support rail interlocking configuration for multiple spaced refrigerant bricks carried intermediate food trays for distributed cooling.

2. Background

Galley carts are used on an aircraft to store food and beverages that need to be refrigerated and/or frozen during the duration of a flight. Conventional galley carts require the use of a powered heat exchanger (i.e., a chiller) to cool a housing cavity of the cart where the food products are stored. However, the heat exchanger discharges heated air to the environment surrounding the cart and consumes power that can be otherwise be used by the aircraft. Further, additional cabin cooling is needed to counteract the heated air discharged from the heat exchanger. As such, at least some known galley carts use dry ice to cool the housing cavity. However, when the dry ice is placed within the cart, it cools locally and the cooling stratifies along the height of the cart. To alleviate this problem, fans are added to the carts to circulate the cool air within the housing cavity. However, the fan requires a power source. Further, the dry ice releases $CO_2$ gas as it sublimates. The $CO_2$ can accumulate in the cabin and cause the $CO_2$ concentration to increase above a predetermined threshold for $CO_2$ in the cabin. Moreover, the cost of dry ice is increasing and airlines need to manage their dry ice supplies. The proposed invention allows airlines to stop using dry ice.

It is therefore desirable to provide a galley cart with distributed cooling which overcomes the limitations of current galley carts.

SUMMARY

Embodiments disclosed herein provide a storage container having a housing defining a cavity therein. At least one support rail extends from the housing within the cavity having a plurality of first moieties for an encoded connector. At least one refrigerant brick having mating encoded second moieties configured to be received into the encoded first moieties couples the refrigerant brick within the cavity.

The embodiments provide a method for cooling of a galley cart wherein a galley cart is provided with support rails on the inner sides of a housing, Selected support rails are encoded as a first mating moiety. Refrigerant bricks are encoded with a second mating moiety, are pre-frozen, and are received on the selected support rails in a selected configuration. Storage drawers or trays are inserted on intermediate support rails between the selected support rails supporting the refrigerant bricks.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a storage container for food and beverages for use, in example embodiments, as a galley cart for airline in-flight service.

Figure 1A:
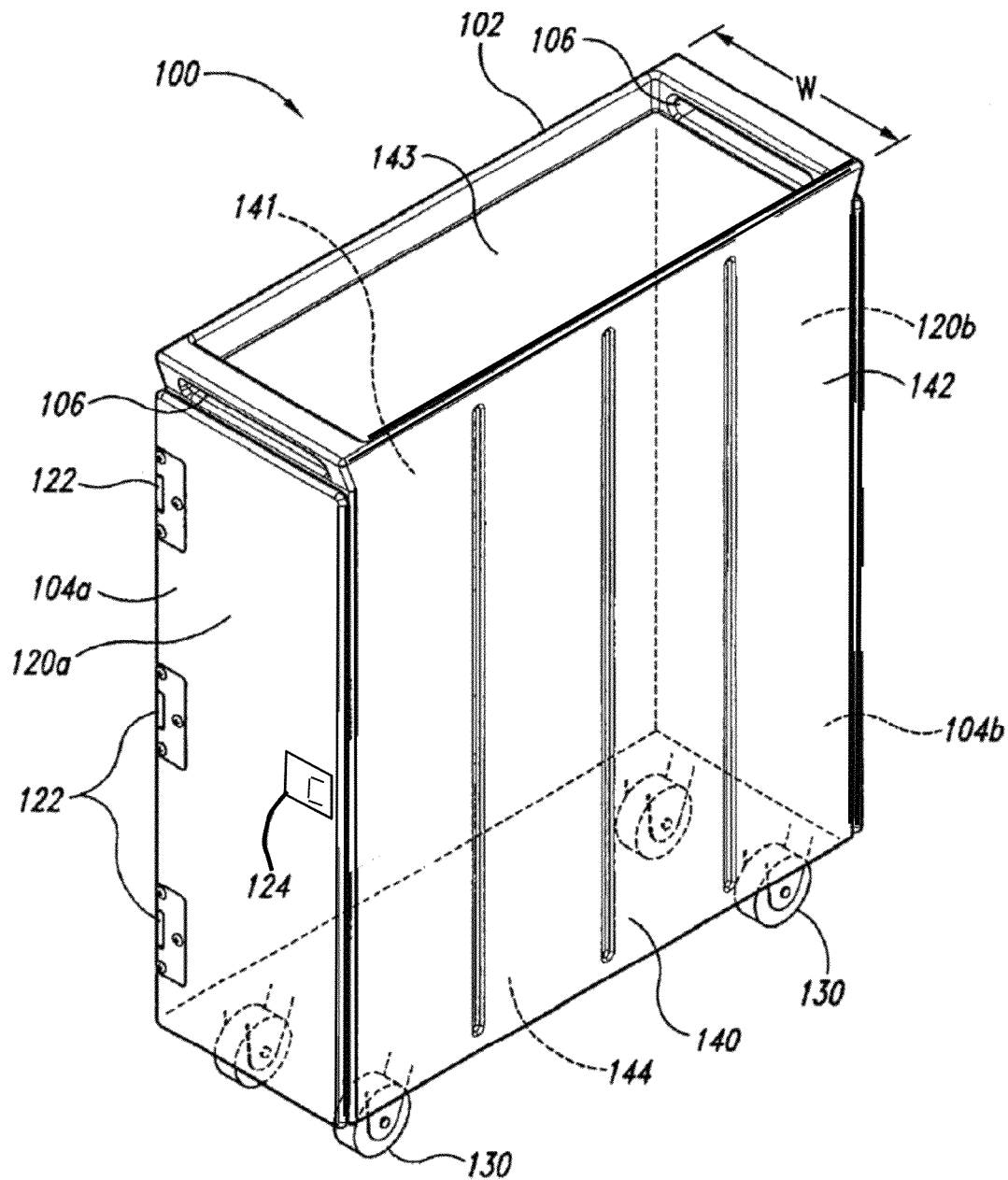
FIG. 1A is an external isometric view of a galley cart with which the present embodiments may be employed.
Figure 1B:
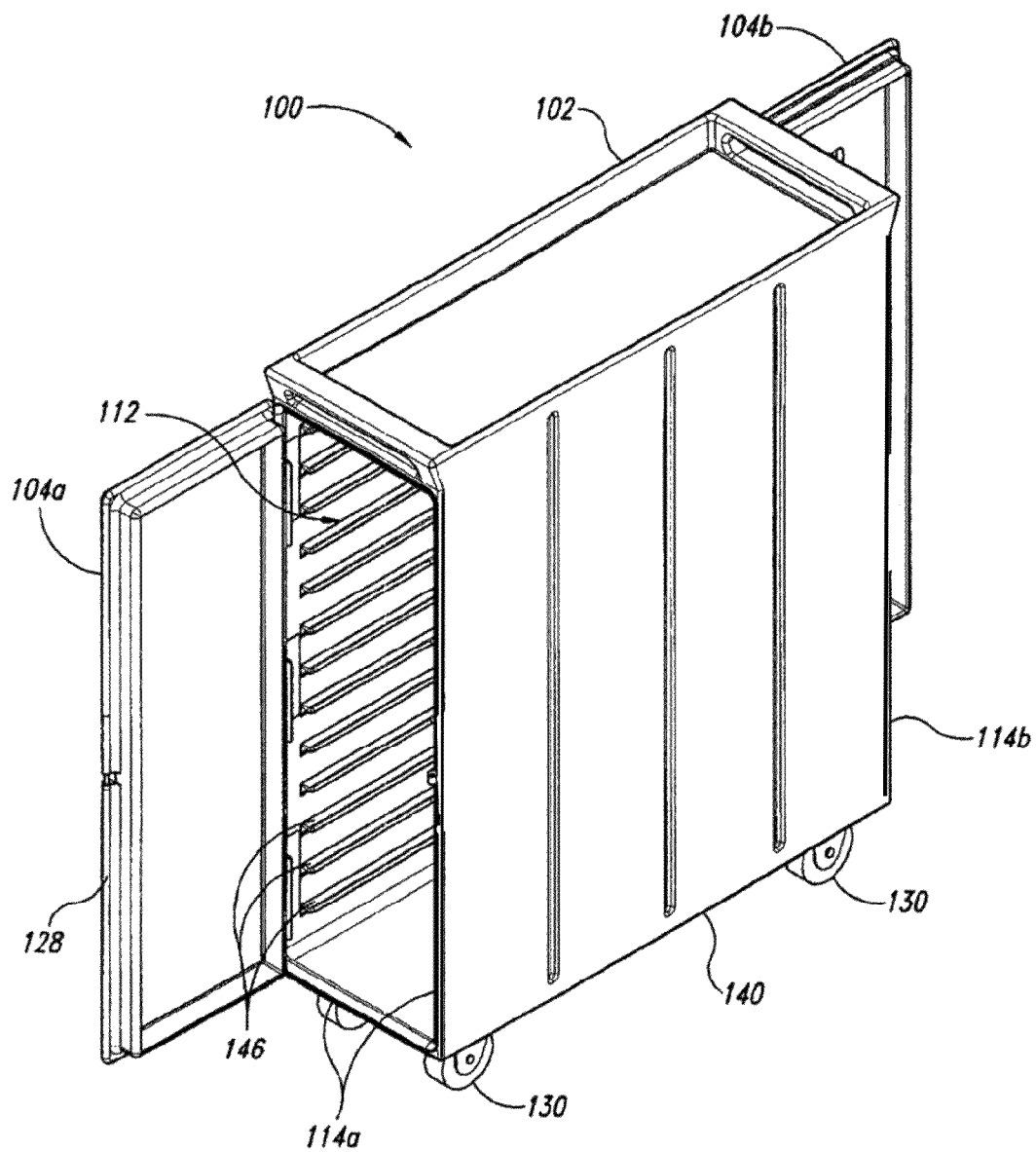
FIG. 1B is an isometric view of the galley cart of FIG. 1A with the doors open exposing the interior cavity of the housing of the cart.

Referring to the drawings, FIGS. 1A and 1B are isometric views of a galley cart 100 which may be employed in the embodiments disclosed herein. Referring to FIGS. 1A and 1B together, in one aspect of this embodiment, the galley cart 100 includes a housing 102 having a housing shell 140 ("housing shell 140"). In the illustrated embodiment, the housing shell 140 forms a first side portion 141, a second side portion 142, a top portion 143, and a bottom portion 144 of the housing 102. The galley cart 100 further includes a first door 104a positioned toward one end of the housing 102, and a second door 104b positioned toward an opposite end of the housing 102. Each of the doors 104 can further include a plurality of hinges 122 and a latch 124. The hinges 122 pivotally attach the door shells 120 to the housing shell 140. The latch 124 can be configured to releasably engage corresponding receivers on or in the housing shell 140 when the doors 104 are in closed positions as illustrated in FIG. 1A.

By disengaging the latch 124 the doors 104 can be opened outwardly providing access to an interior cavity 112 of the housing 102 as illustrated in FIG. 1B. In a further aspect of this embodiment, the interior cavity 112 of the housing 102 include a plurality of support rails 146 configured to support a plurality of food trays or drawers (not shown). Positioning the doors 104 at respective ends of the housing 102 allows flight attendants to conveniently access food stored within the housing 102 from either end of the galley cart 100. In other embodiments, the second door 104b can be omitted if desired. As further illustrated in FIG. 1B, each of the doors 104 can additionally include a compressible seal 128 configured to seal any gaps that may exist between the doors 104 and corresponding housing apertures 114a-b when the doors 104 are closed. Wheels 130 allow the galley cart to be easily maneuvered within the service areas and aisles of the aircraft. Handles 106, integral with the top portion 143 for the embodiment shown, are provided to be grasped by the flight attendants when maneuvering the galley cart.

Figure 2A:
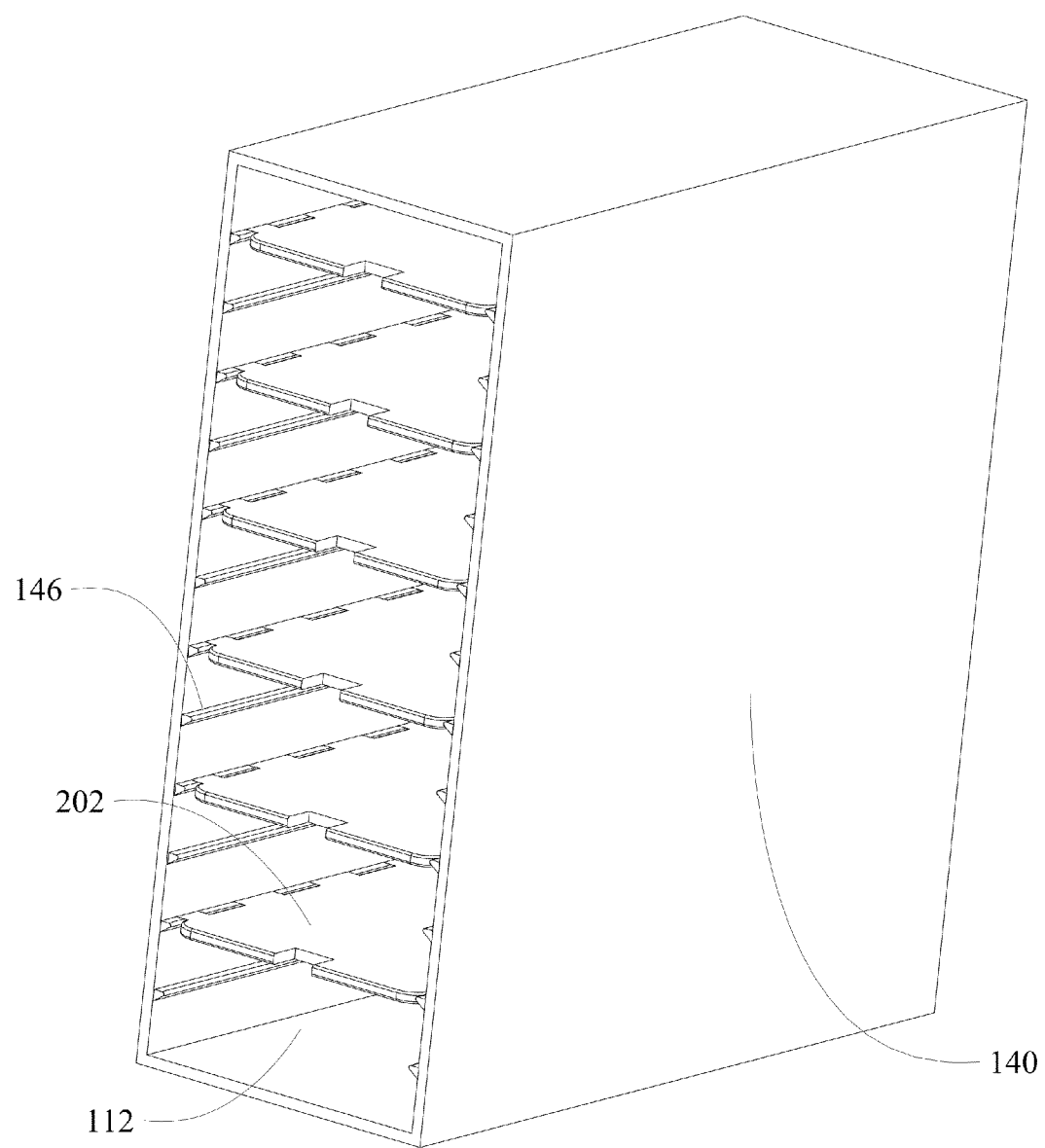
FIG. 2A is an isometric front view of the housing showing refrigerant bricks of a first embodiment inserted on support rails.

A first embodiment shown in FIG. 2A provides cooling for the galley cart 100 by providing multiple individual refrigerant bricks 202 which are received in the interior cavity 112 of the housing 140. As will be described in greater detail subsequently, the refrigerant bricks 202 interengage selected support rails 146. The refrigerant bricks 202 may be fabricated from molded plastic or similar materials and contain refreezable liquid or chemical compositions such as Rubbermaid BLUE ICE® or salt water mixtures. Because the bricks include a refrigerant that can be frozen prior to use, dry ice is not used in the cart and no additional power source for the cart is needed. Further, as the bricks cool the surrounding volume, the bricks do not emit any gases or other materials.

Figure 2B:
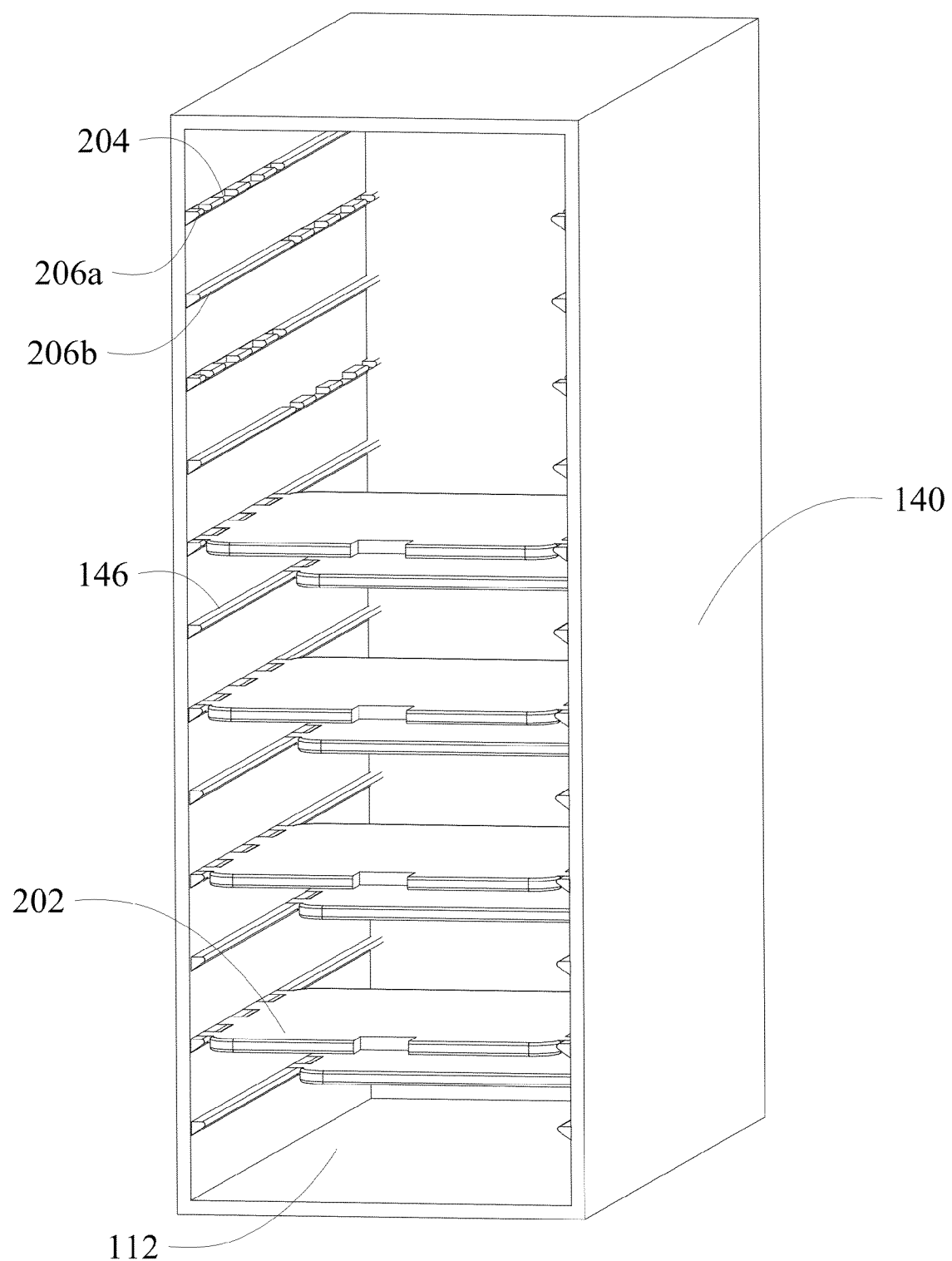
FIG. 2B is an isometric front view of the housing showing the support rails with a first encoding moiety for a mating connector in the first embodiment.
Figure 3A:
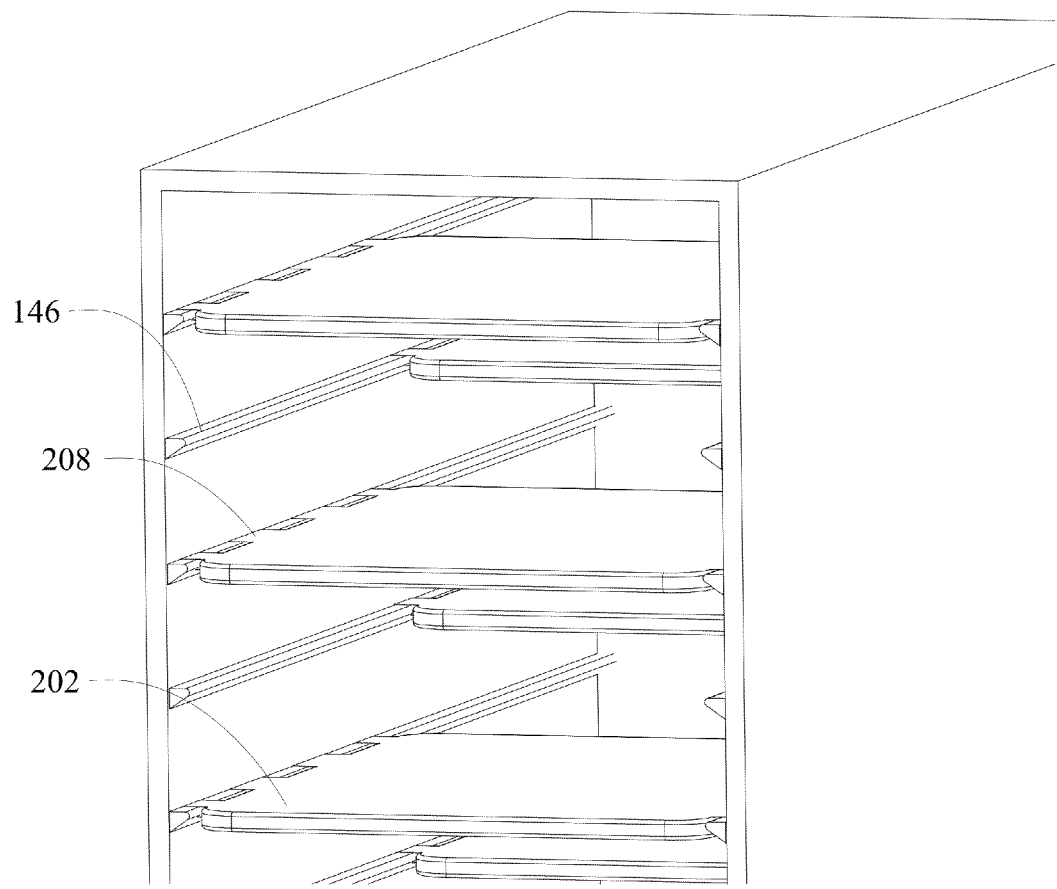
FIG. 3A is a detailed partial isometric view of the embodiment of FIGS. 2A and 2B showing the refrigerant bricks mated on the support rails.
Figure 3B:
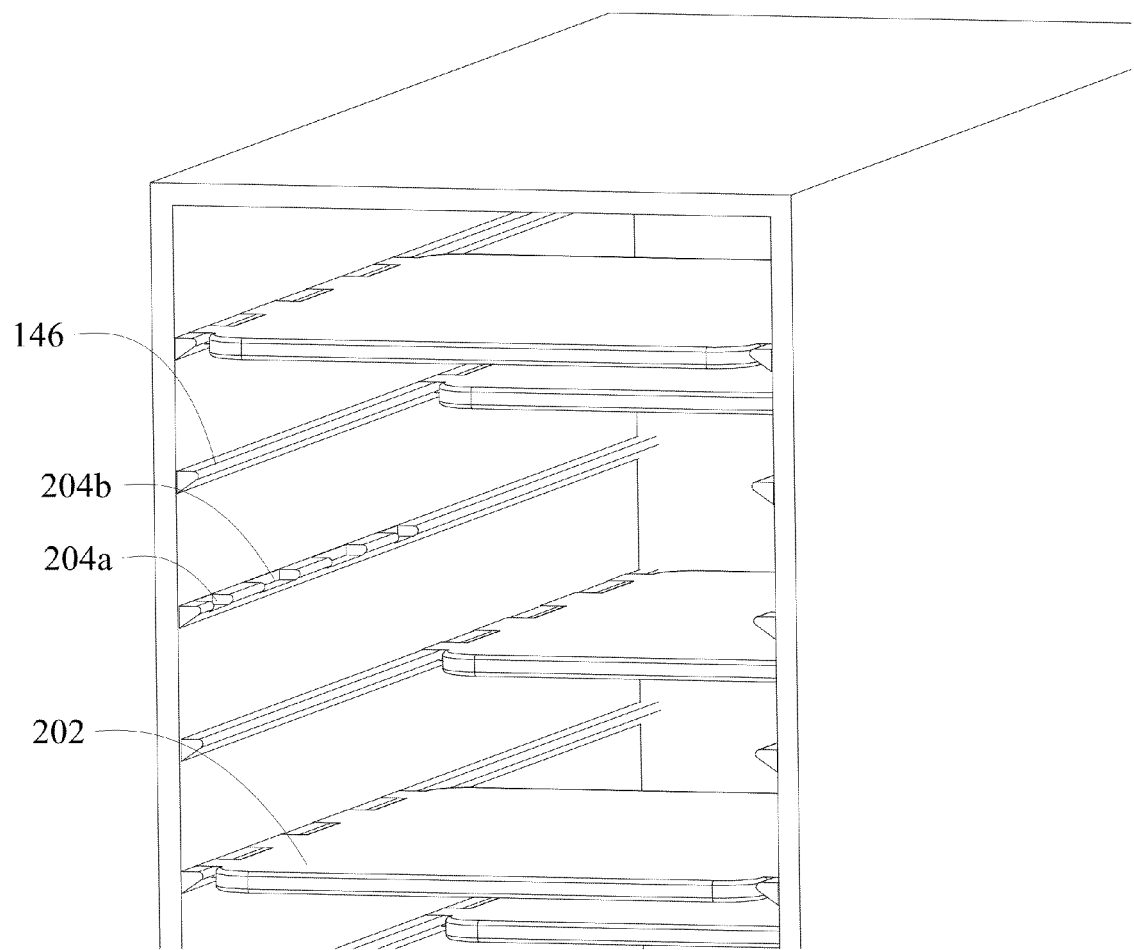
FIG. 3B is a detailed partial isometric view of the embodiment of FIGS. 2A and 2B showing the refrigerant bricks mated on the support rails with one brick removed to show the slots in the rails.

As seen in FIG. 2B, the support rails 146 have depressions or slots 204 defined therein along either half the rail length or the whole rail length. When the slots 204 are in a first half of a selected rail length, as shown for example on rail 206a, the rail 206b above and/or below the selected rail has slots in the second half of the rail length, as shown for example on rail 206b. The embodiment shown employs relatively flat and thin refrigerant bricks 202. As shown in FIG. 3A, the refrigerant bricks 202 each have tabs 208 horizontally extending from two opposing side edges 209a and 209b of the brick (seen in FIGS. 4A and 4B) which are configured to be inserted into the slots 204 on the support rails as mating moieties of an encoded connection. FIG. 3B shows one brick removed to show the slots 204 with the bricks in an alternating configuration to be described in greater detail subsequently.

Figure 4B:
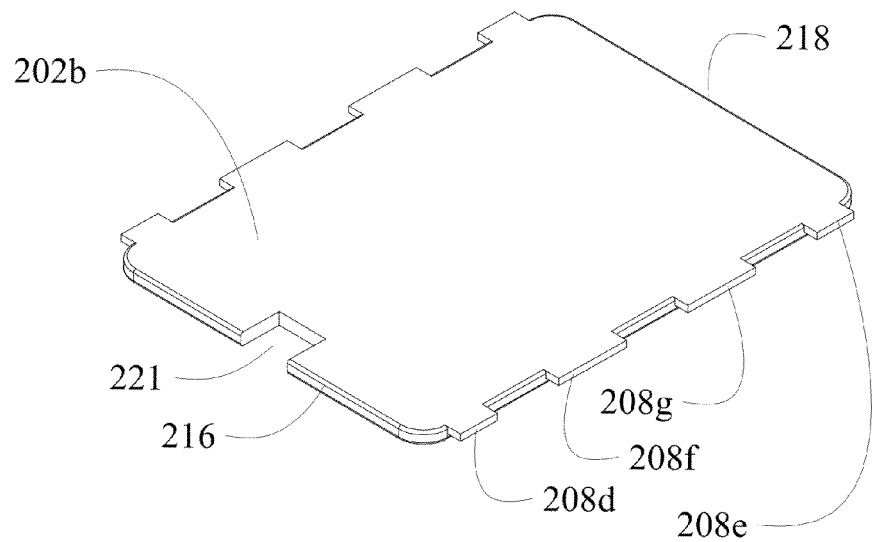
FIG. 4B is a detailed isometric view of a long-haul brick of the first embodiment.
Figure 4A:
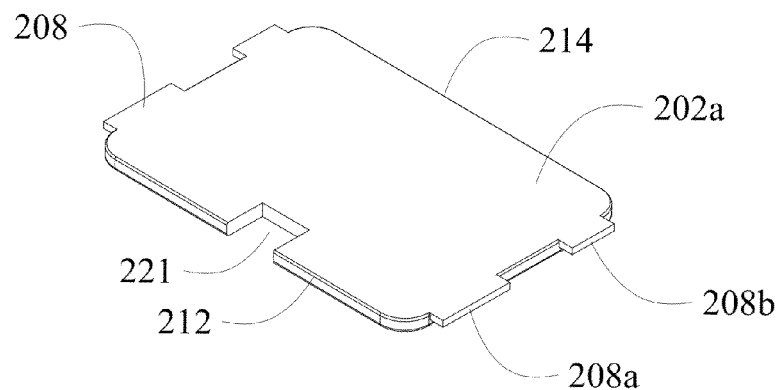
FIG. 4A is a detailed isometric view of a standard haul brick of the first embodiment.
Figure 4C:
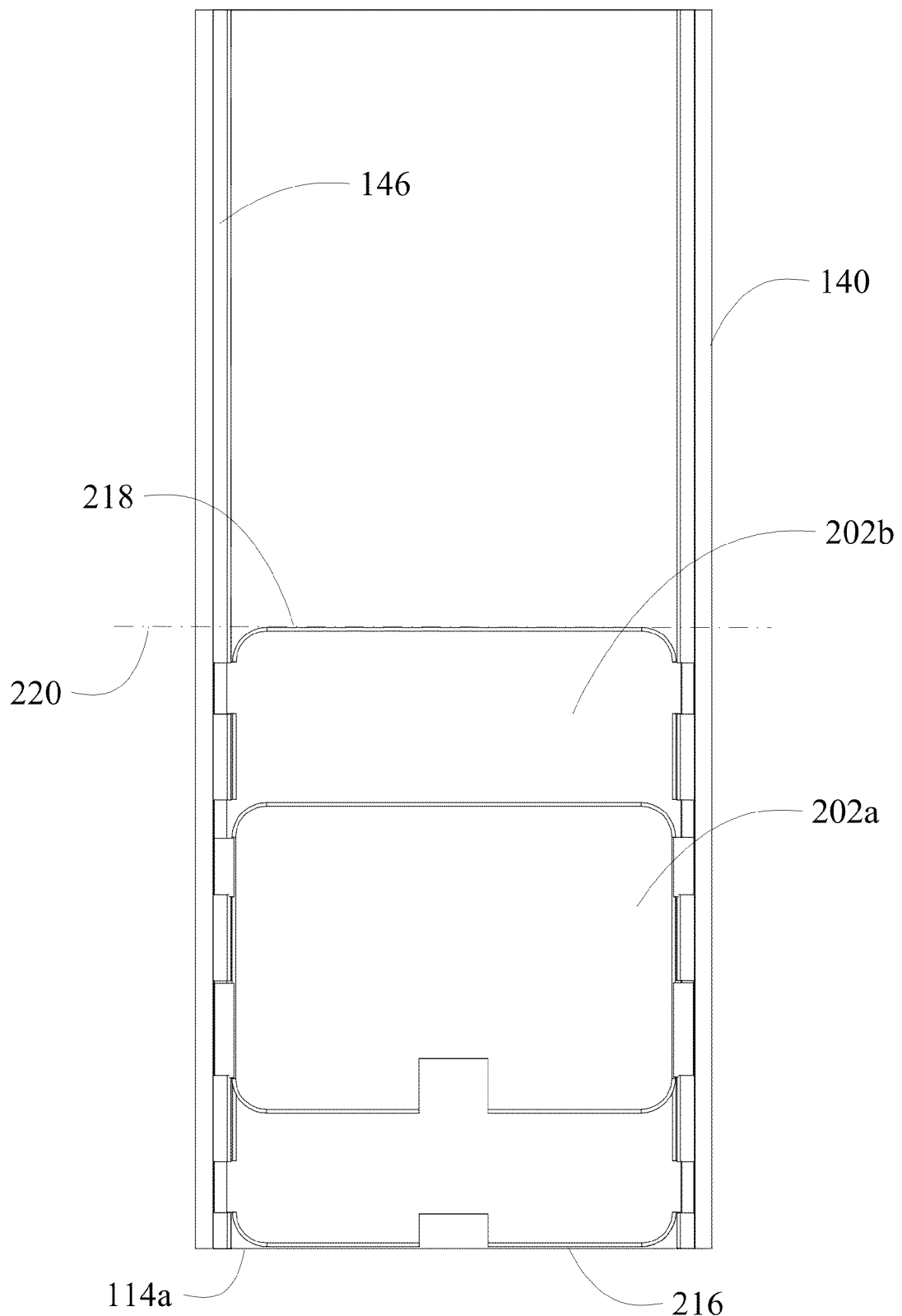
FIG. 4C is a top section view of the housing showing an overlayed standard haul brick on a long haul brick.

The bricks shown in detail in FIGS. 4A and 4B can come in at least two different sizes; a standard size brick 202a and a long-haul size brick 202b. The length of a long-haul sized brick is substantially one half the internal length of the housing. The length of the standard size brick is approximately one third of the internal length of the housing. In alternative embodiments lengths of the bricks may be varied to accommodate various storage configurations and storage drawer sizes. The airlines can select which size(s) of bricks to insert in the cart based on flight conditions (i.e., duration). Relative size of the standard and long haul bricks is seen in FIG. 4C. Tabs 208 as a first mating moiety on the bricks 202 may have differing sizes to encode a proper orientation and position for the brick on the selected support rail. As shown in FIG. 4A a standard haul brick 202a may have opposing tabs 208a having a first longitudinal dimension ("wide tabs") adjacent a first end 212 of the brick and opposing tabs 208b having a second longitudinal dimension narrower than the first longitudinal dimension ("narrow tabs") adjacent a second end 214 of the brick. A long haul brick 202b as shown in FIG. 4B may have opposing narrow tabs 208d adjacent a first end 216 and opposing narrow tabs 208e adjacent a second end 218 with two sets of opposing wide tabs 208f and 208g between the narrow tabs. In exemplary embodiments the first longitudinal dimension of the wide tabs may be approximately 2¾ inches while the second longitudinal dimension of the narrow tabs may be approximately 1½ inches. As shown in FIGS. 3B and 4C, the slots 204 in the support rail 146, as a second mating moiety, may be narrow slots 204a corresponding to the second longitudinal dimension for tabs on the bricks or wide slots 204b corresponding to the first longitudinal dimension of the tabs on the bricks. A narrow slot followed by two wide slots followed by a narrow slot provides an encoded mating engagement of a long haul brick placing the first end 216 immediately adjacent the end aperture 114a and the second end 218 adjacent a center plane 220 of the cart. Mating engagement of a standard brick centers the brick between the aperture and the center plane of the cart. The small tabs of the standard brick will be received in either wide slot but the wide tab can only be received in one of the wide slots thereby providing the centering position with either of two mirrored orientations of the standard brick. While a single orientation for each of the standard and long haul bricks has been shown, alternative encoding patterns may be employed to specifically orient bricks on various support rails within the cart. Additionally, a finger slot 221 may be employed to assist in handling of the refrigerant bricks for insertion and removal and to provide a visual reference for the orientation of the brick to assure alignment of the encoded mating moieties.

Figure 5A:
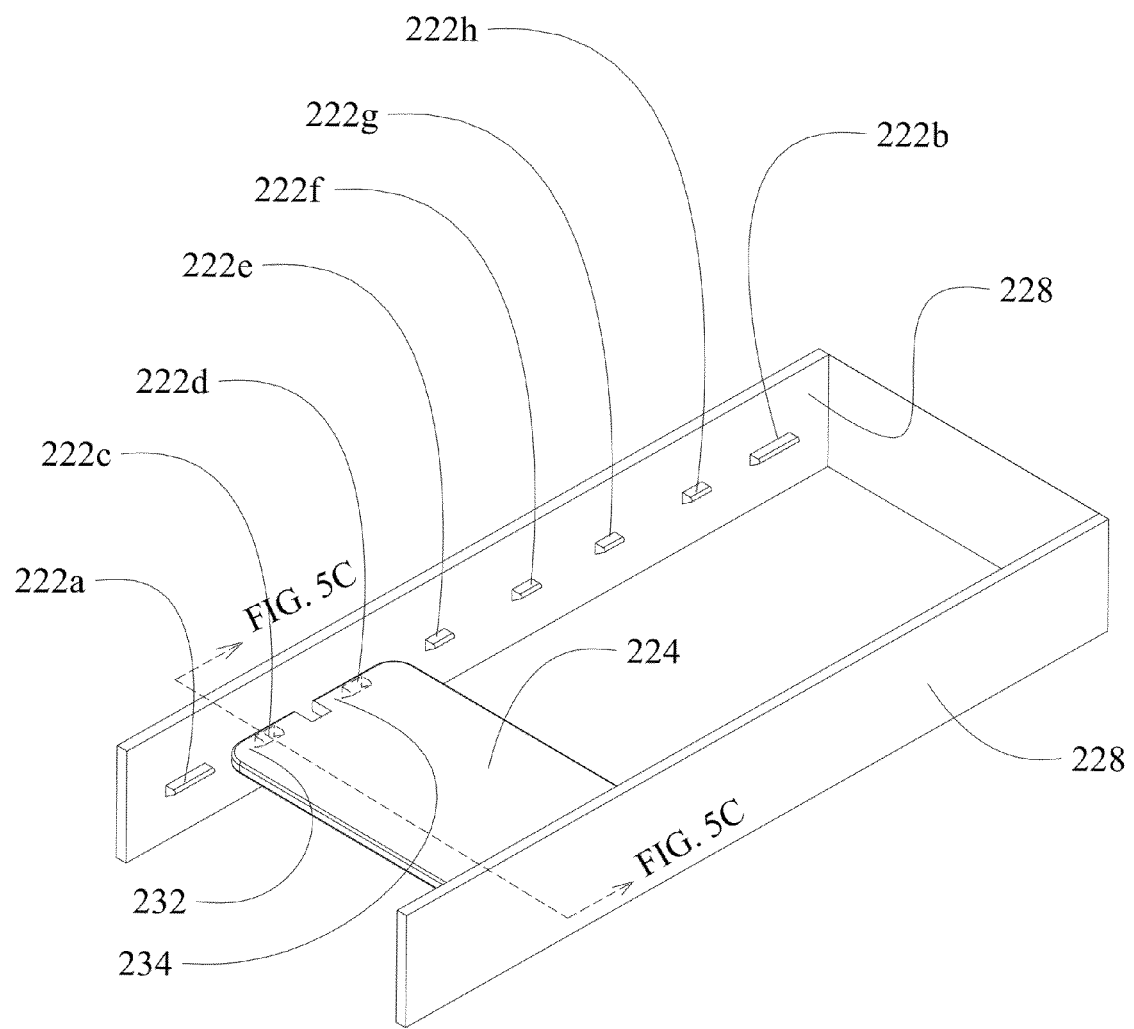
FIG. 5A is a partial isometric detail of a second embodiment of the selected support rails and the refrigerant bricks.
Figure 5B:
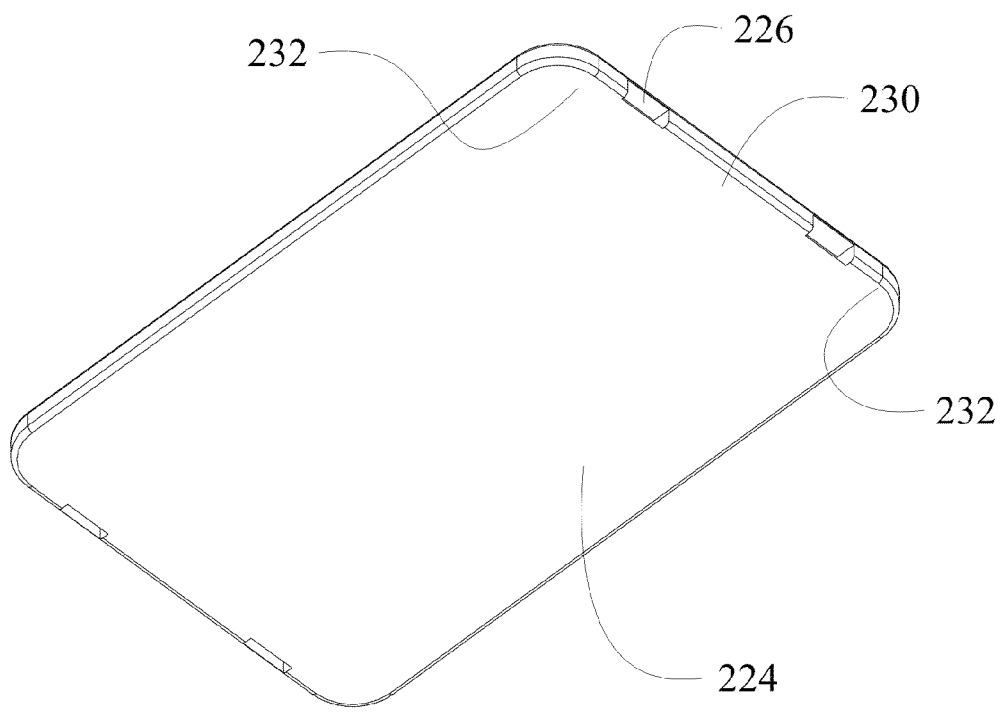
FIG. 5B is an isometric view of a standard haul brick of the second embodiment.
Figure 5C:
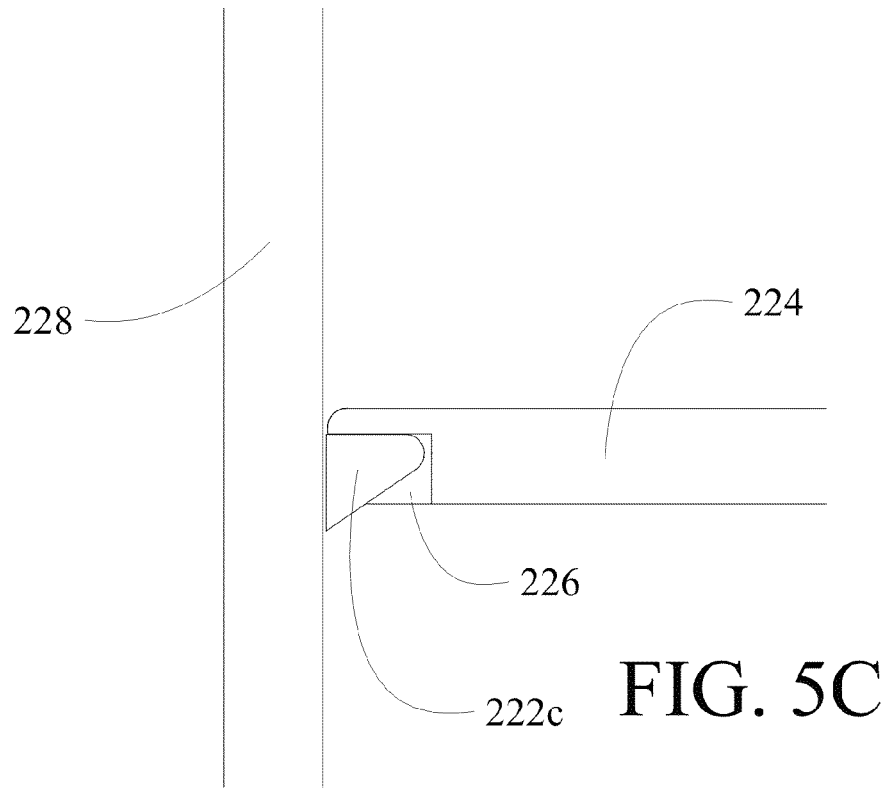
FIG. 5C is a front partial section detailed view of the refrigerant brick, housing side and support rail for the second embodiment.
Figure 5D:
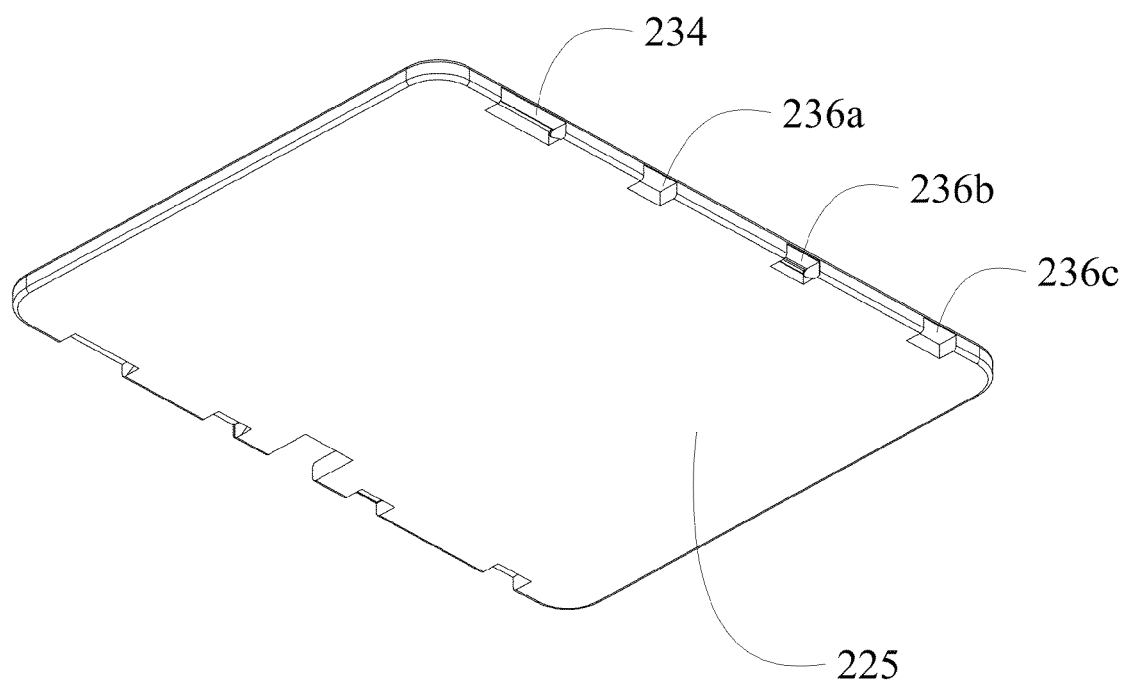
FIG. 5D is an isometric view of a long haul brick of the second embodiment.

An alternative embodiment for the support rails and refrigerant bricks is shown in FIGS. 5A-5D wherein the support rails receiving the refrigerant bricks are divided into segments having various lengths; wide segments 222a and 222b and narrow segments 222c, 222d, 222e, 222f, 222g and 222h (as shown in FIG. 5A) as the second mating moiety for the encoded coupling. The refrigerant bricks, such as a standard brick 224 shown in FIG. 5B, incorporate indentations 226 as the first mating moiety of the encoded coupling to receive the support rail segments. This geometry allows the volume of the refrigerant bricks to extend to the walls 228 of the housing (shown in FIG. 5A as partial views of the side portions 141 and 142 of FIGS. 1A and 1B). As shown in FIGS. 5A, 5B and 5C, intermediate portions 230 and end portions 232, provide significant additional volume for refrigerant between the indentations and outside the indentations respectively. As with the prior embodiment, the encoding of matching segments on the rails and indentations on the refrigerant bricks allows specific positional definition for the refrigerant bricks. As shown in FIG. 5A, a standard brick 224 having two short indentations 226 may only be received on corresponding rail short elements 222c and 222d or 222f and 222g. A long haul brick 225 as shown in FIG. 5D employs a wide indentation 234 and three short indentations 236a, 223b and 236c. A central mounting within the housing of either standard or long haul brick may be accomplished since the narrow segment 222d or 222f may be received in the wide indentation 234 when mounted from opposite apertures of the cart.

Figure 6A:
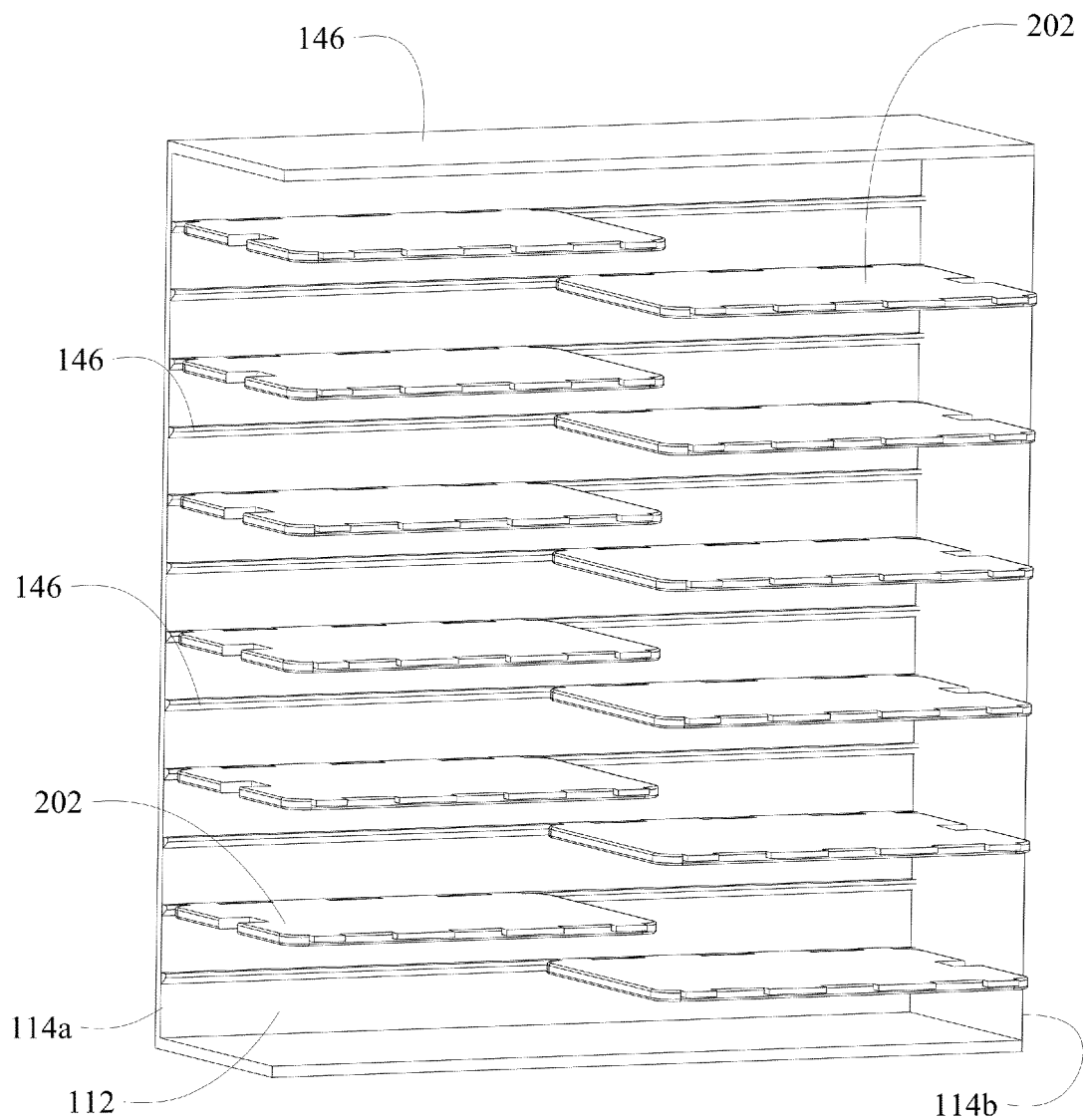
FIG. 6A is an isometric cutaway view of the housing with refrigerant bricks installed in a full cart configuration.
Figure 6B:
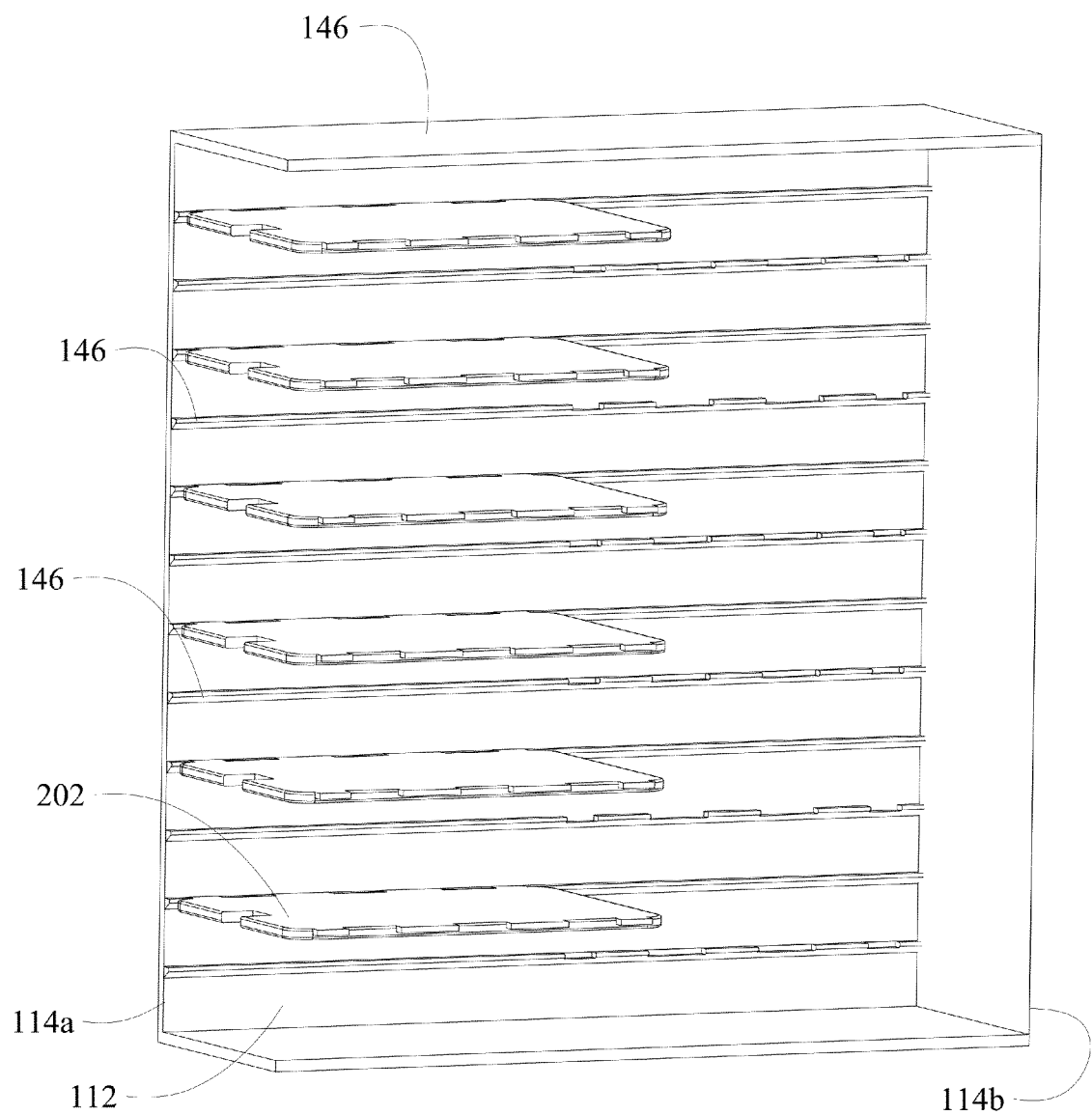
FIG. 6B is an isometric cutaway view of the housing with refrigerant bricks installed in a vertical half cart configuration.
Figure 6C:
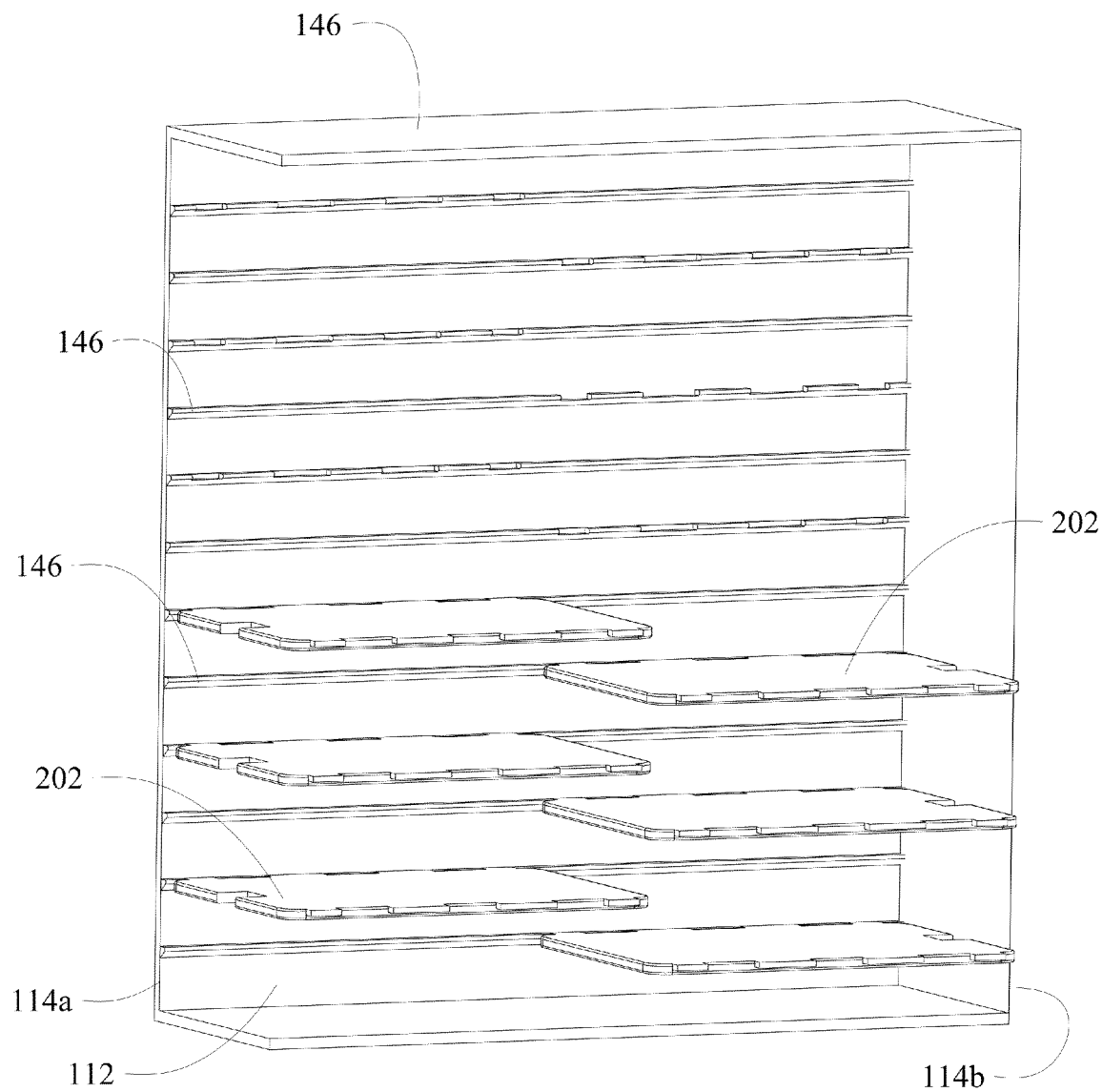
FIG. 6C is an isometric cutaway view of the housing with refrigerant bricks installed in a horizontal half cart configuration.

The bricks can be positioned in a full cart configuration as shown in FIG. 6A, with refrigerant bricks 202 staggered on alternating rails 146 inserted from opposite apertures 114a and 114b. A vertical half cart configuration as shown in FIG. 6B employs bricks 202 mounted from only one aperture in the cart. A horizontal half cart configuration as show in FIG. 6C allows cooling of selected portions of the cart cavity 112.

Figure 7A:
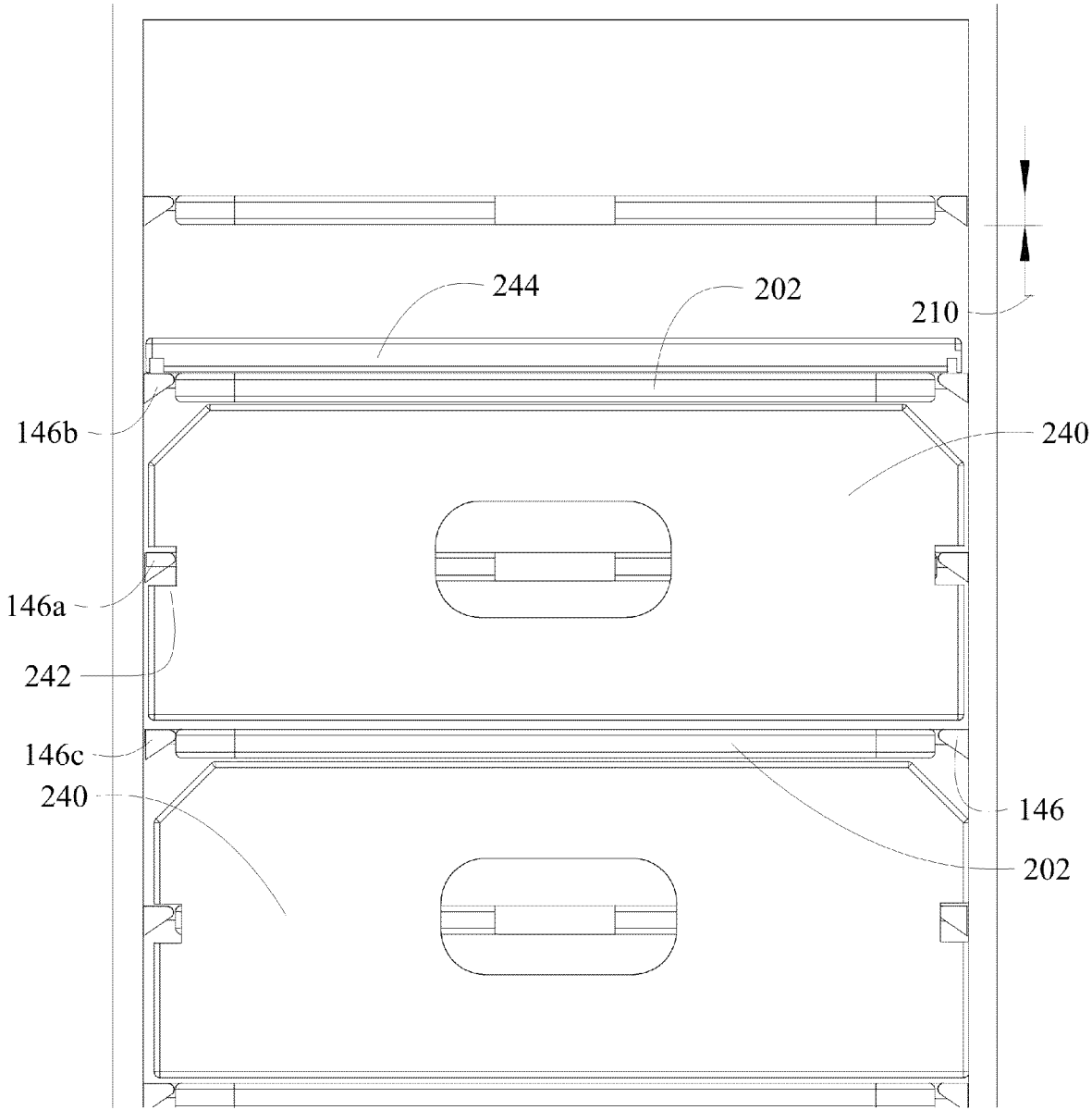
FIG. 7A is a detailed partial front view of the housing with refrigerant bricks installed and a storage drawer and serving tray in stored position.
Figure 7B:
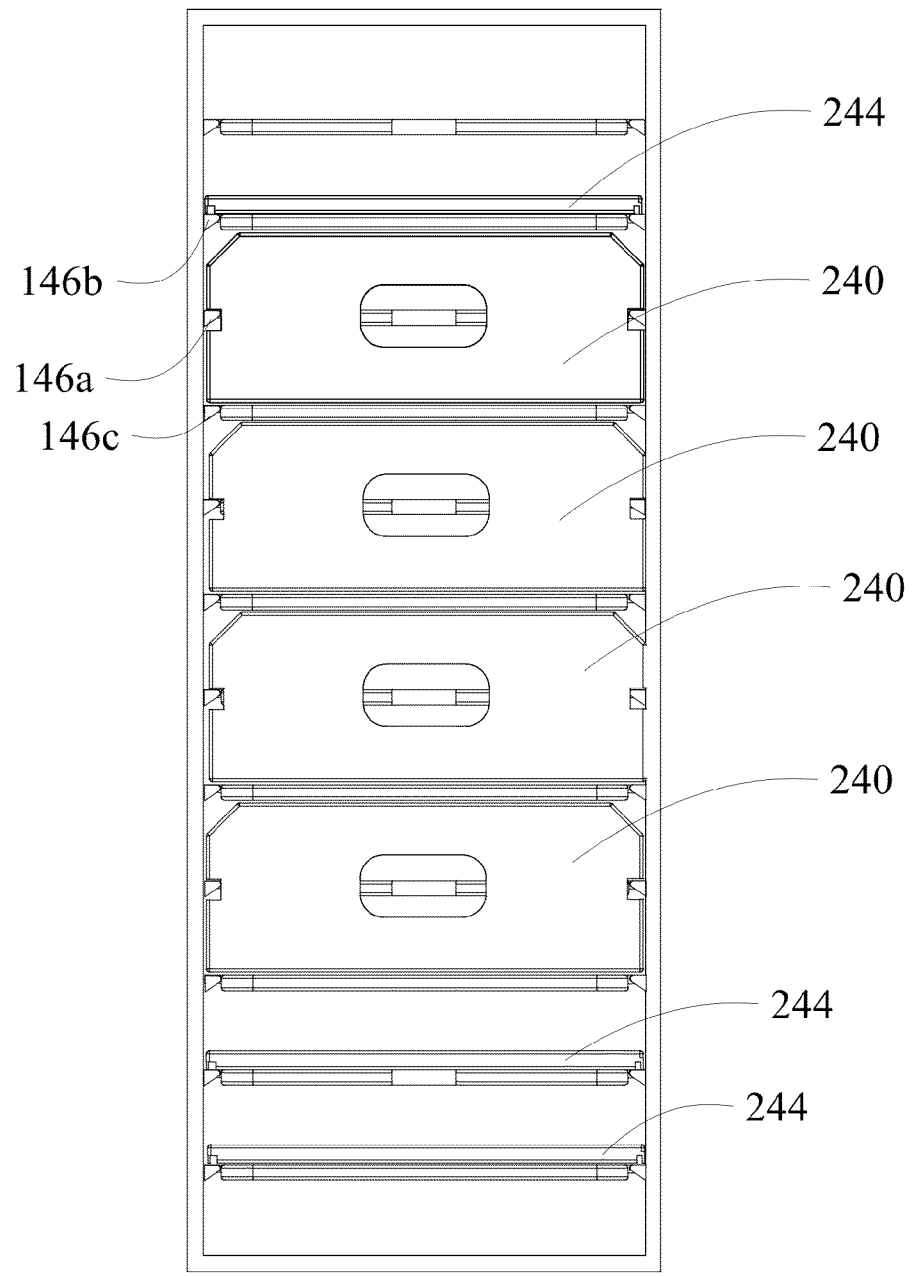
FIG. 7B is a front view of the housing with the storage drawers in a full cart configuration.
Figure 7C:
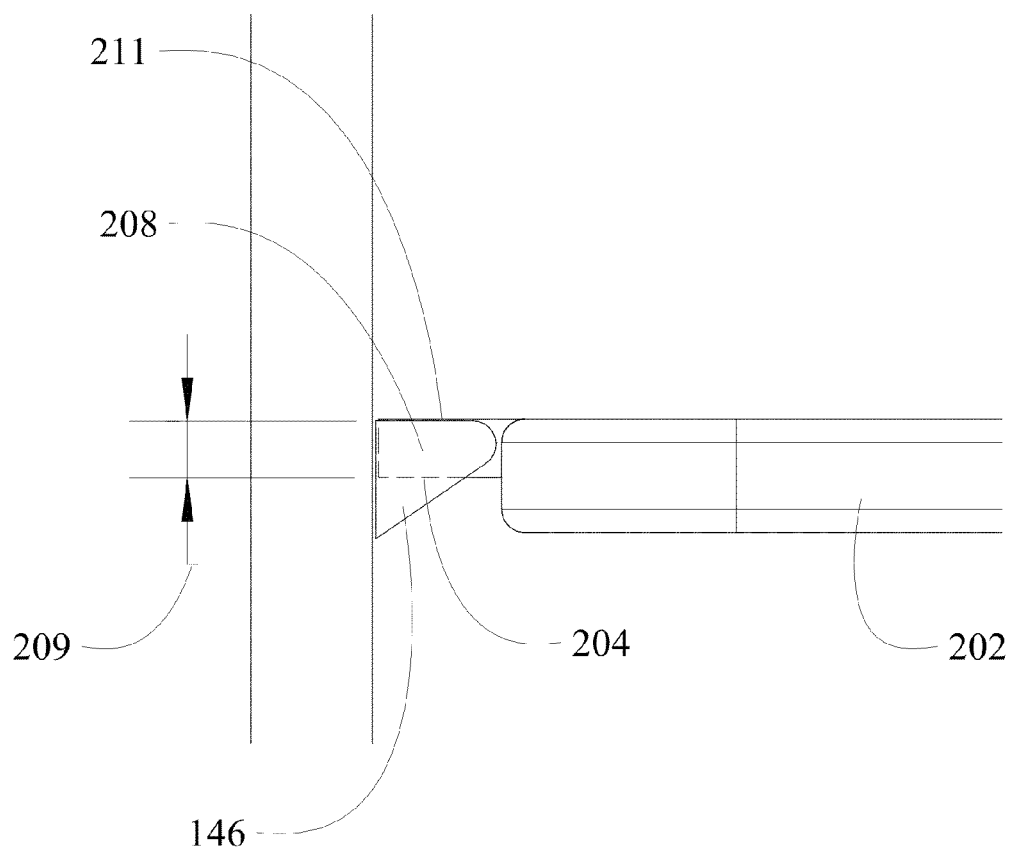
FIG. 7C is a detailed partial section view of the housing, support rail and refrigerant brick tab configuration for the first embodiment.

As shown in FIGS. 7A and 7B, the bricks 202 have a thickness 210 that is substantially equal to a height of the support rails 146 as shown in FIG. 7A so the bricks do not occupy cavity volume that could otherwise be occupied by supplies. As shown in FIG. 7C, the thickness 209 of the tabs 208 corresponds to the depth of the slots 204 in the support rails 146 thereby creating a flat surface with the upper surface 211 of the support rail. Clearance is thereby provided for storage drawers 240 to be received between the refrigerant bricks. For the embodiment shown, the storage drawers employ a central support channel 242 to receive the support rail 146a between the support rails 146b and 146c holding the refrigerant bricks. However, in alternative embodiments, the central support channel is not required and the storage draws are support on the support rail/refrigerant brick surface. Serving trays 244 may also be supported either by the rails or by the refrigerant bricks. As show in FIG. 7B for a full cart configuration as described above with respect to FIG. 6A storage drawers are inserted from opposite apertures in the cart and abut the alternating refrigerant bricks thereby providing baffling for limiting the dispersion of convection cooling between the bricks.

Figure 8A:
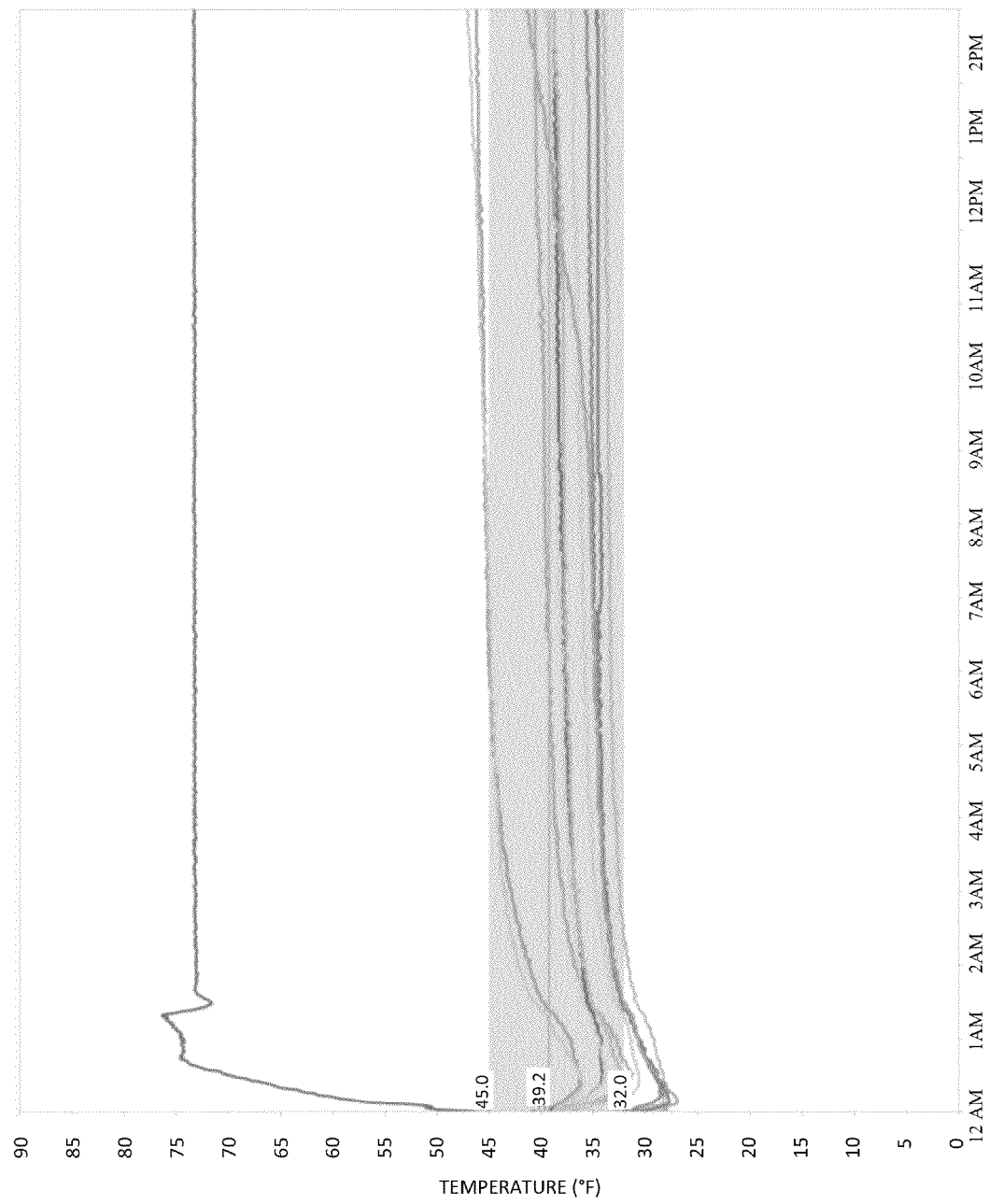
FIG. 8A is a graph showing temperature profiles over time for 12 thermocouples placed in a cart with a full cart configuration.
Figure 8B:
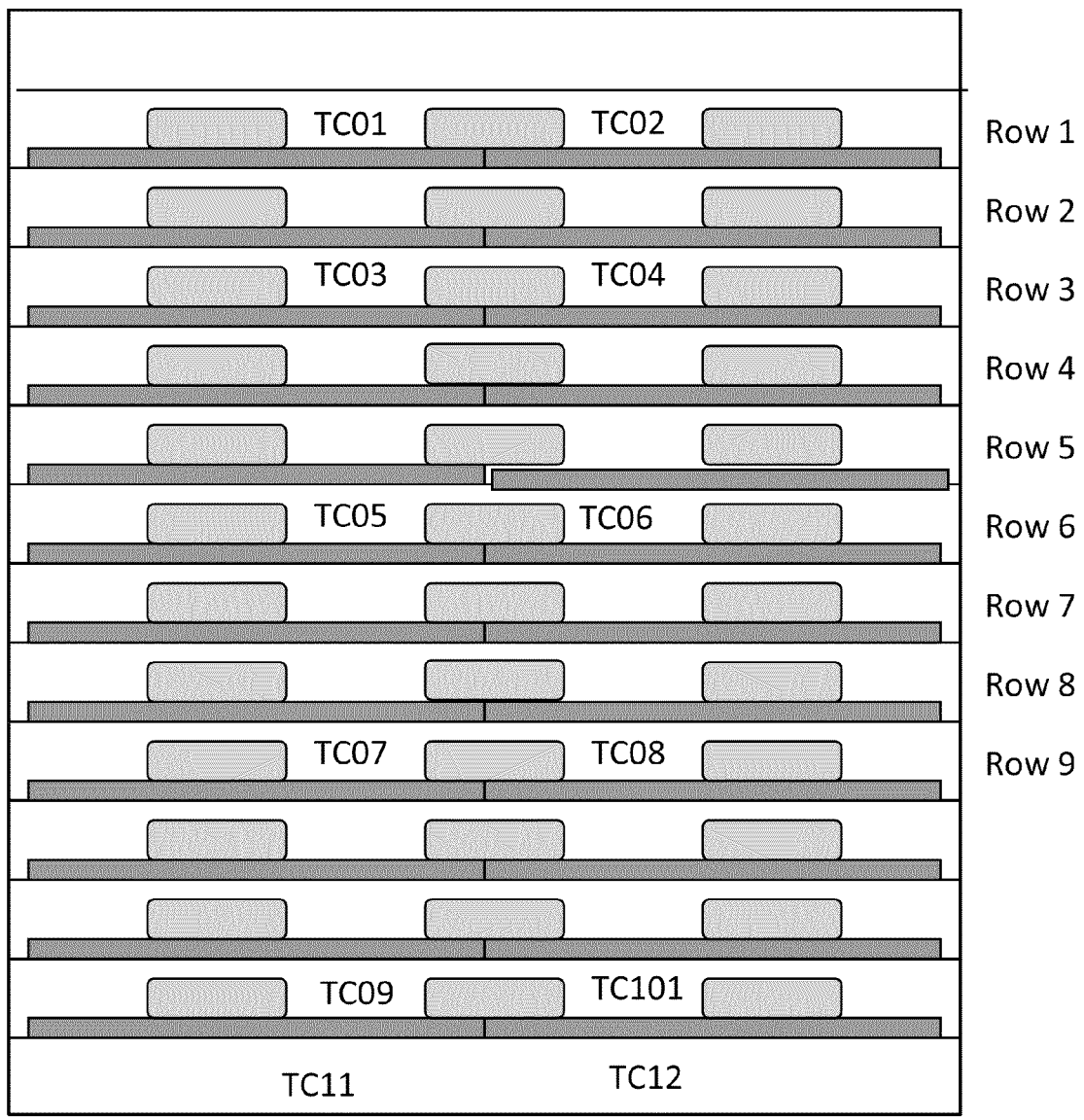
FIG. 8B is a block diagram representing the thermocouple locations producing the temperature configuration shown in FIG. 8A; and, FIG. 9 is a flow chart of the method for cooling a galley cart provided by the disclosed embodiments.

As shown in FIG. 8A for a configuration of thermocouples TC01 to TC12 shown in FIG. 8B, the temperatures provided by the refrigerant bricks in a full cart configuration, as described above with respect to FIG. 6A, are maintained at a substantially evenly distributed common temperature with a variation of only about 12 degrees F. between top and bottom and maintaining the temperature over a 12 hour period (2 AM to 2 PM) with a variance of only about 2 degrees.

Figure 9:
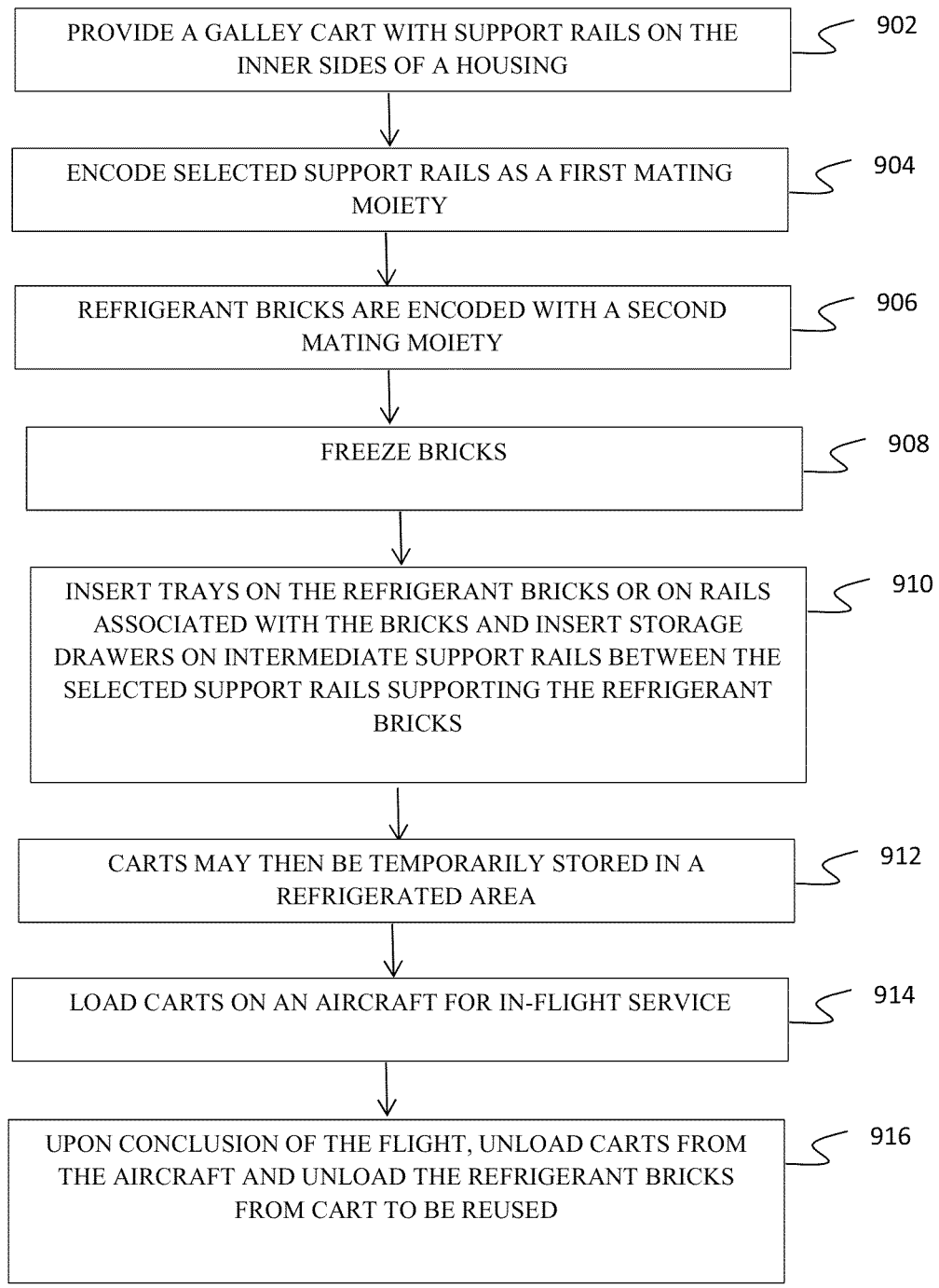

The embodiments described provide a method for cooling of a galley cart as shown in FIG. 9. A galley cart is provided with support rails on the inner sides of a housing, step 902. Selected support rails are encoded as a first mating moiety, step 904. Refrigerant bricks are encoded with a second mating moiety, step 906, are frozen, step 908, and are received on the selected support rails in a selected configuration, step 910. Trays may be inserted on the refrigerant bricks or on rails associated with the bricks and storage drawers are inserted on intermediate support rails between the selected support rails supporting the refrigerant bricks, step 912. Carts may then be temporarily stored in a refrigerated area, step 914. Carts are then loaded on an aircraft for in-flight service, step 916. Upon conclusion of the flight, carts are unloaded from the aircraft and the refrigerant bricks are unloaded to be reused, step 918.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A storage container comprising:
a housing defining a cavity therein;
at least one support rail extending from the housing within the cavity;
a plurality of encoded first moieties integral to the support rail; and
at least one refrigerant brick having mating encoded second moieties configured to be received into the encoded first moieties to couple the refrigerant brick within the cavity in a selected configuration with respect to other refrigerant bricks carried within the housing, said configuration determined by encoding of the first moieties and the second moieties.

2. The storage container as defined in claim 1 wherein the encoded first moieties are slots in the at least one support rail and the encoded second moieties are tabs extending from opposing sides of the at least one refrigerant brick.

3. The storage container as defined in claim 2 wherein the encoded first moieties comprise wide and narrow slots ordered in a pattern and the encoded second moieties comprise wide and narrow tabs ordered in a mating pattern to be received in the associated wide and narrow slots.

4. The storage container as defined in claim 1 wherein the encoded first moieties are support rail segments and the encoded second moieties are indentations in opposing edges of the at least one refrigerant brick.

5. The storage container as defined in claim 4 wherein the encoded first moieties comprise wide and narrow segments ordered in a pattern and the encoded second moieties comprise wide and narrow indentations ordered in a mating pattern to be received in the associated wide and narrow segments.

6. The storage container as defined in claim 1 wherein the at least one refrigerant brick is configured to extend under a storage drawer supported on the at least one support rail.

7. The storage container as defined in claim 1 wherein the at least one refrigerant brick is configured to extend over a storage drawer supported on a lower at least one support rail.

8. The storage container as defined in claim 1 wherein the at least one refrigerant brick has a thickness substantially equal to a height of the at least one support rail.

9. The storage container as defined in claim 8 wherein a top surface of the at least one refrigerant brick is substantially co-planar with a top surface of the at least one support rail when the refrigerant brick is coupled rail.

10. The storage container as defined in claim 1 wherein the at least one refrigerant brick comprises a rigid shell and a refrigerant within the shell.

11. The storage container as defined in claim 10 wherein the refrigerant is configured to freeze at a temperature at or below 0° C.

12. The storage container as defined in claim 1 wherein the at least one refrigerant brick is a first sized brick defined for standard use.

13. The storage container as defined in claim 1 wherein the at least one refrigerant brick is a second sized brick defined for long-haul use.

14. The storage container as defined in claim 1 wherein the encoded engagement moieties are defined along about half of a length of the at least one support rail.

15. The storage container as defined in claim 1 wherein the at least one at least one support rail comprises a plurality of support rails and the encoded engagement moieties are staggered on adjacent support rails in the plurality of support rails.

16. The storage container as defined in claim 1 wherein the engagement moieties are defined along an entire length of the at least one support rail.

17. A method for cooling a galley cart comprising:
encoding selected support rails on inner walls of a housing of a galley cart as a first mating moiety;
encoding refrigerant bricks with a second mating moiety;
freezing the bricks before use in the galley cart; and receiving the frozen bricks on the selected support rails in a selected configuration determined by encoding of the first moieties and the second moieties.

18. The method as defined in claim 17 further comprising:
inserting storage drawers between the refrigerant bricks.

19. The method as defined in claim 18 wherein inserting the storage drawers comprises:
inserting the storage drawers on intermediate support rails between the selected support rails supporting the refrigerant bricks.

* * * * *